United States Patent [19]

D'Antonio et al.

[11] Patent Number: 4,999,564
[45] Date of Patent: Mar. 12, 1991

[54] POWER SYSTEM STABILIZER SYSTEM HAVING IMPROVED INTEGRITY CHECKING SCHEME

[75] Inventors: Michael J. D'Antonio, Salem; Irving A. Gibbs, Roanoke; Lawrence J. Lane, Salem; Rodney A. Lawson, Fincastle, all of Va.

[73] Assignee: General Electric Company, Salem, Va.

[21] Appl. No.: 420,423

[22] Filed: Oct. 12, 1989

[51] Int. Cl.⁵ .............................................. H02P 9/00
[52] U.S. Cl. ........................................ 322/99; 322/25; 322/58
[58] Field of Search ................. 322/22, 24, 25, 58, 322/99; 324/158 MG; 379/102, 106, 108, 109

[56] References Cited

U.S. PATENT DOCUMENTS

| | | | |
|---|---|---|---|
| 3,474,323 | 10/1969 | Kilgore et al. | 322/24 X |
| 4,463,306 | 7/1984 | de Mello et al. | 322/25 |
| 4,701,689 | 10/1987 | Yuan et al. | 322/58 X |
| 4,733,156 | 3/1988 | Tanaka et al. | 322/22 X |
| 4,741,023 | 4/1988 | Lawson | 322/99 |
| 4,788,653 | 11/1988 | Henderson et al. | 322/58 |
| 4,855,644 | 8/1989 | Lane | 322/19 |

Primary Examiner—R. Skudy
Assistant Examiner—Kristine Peckman
Attorney, Agent, or Firm—Arnold E. Renner

[57] ABSTRACT

In a system for stabilizing the operation of an electrical generator connected to a power distribution network, which system includes a power system stabilizer operating through a modulator circuit to control generator oscillations, there is included a scheme for testing the integrity of the power system stabilizer and modulator circuit which involves the application of a test signal having known values to the power system stabilizer. This test signal propagates through the circuitry and the resultant output is demodulated to be compared with a stored representation of the test signal to thus yield outputs representing the gain and phase shift of the power system stabilizer and modulator circuit in combination.

17 Claims, 3 Drawing Sheets

POWER SYSTEM STABILIZER SYSTEM HAVING IMPROVED INTEGRITY CHECKING SCHEME

BACKGROUND OF THE INVENTION

The present invention relates generally to systems for stabilizing alternating current (AC) synchronous generators and more particularly to a scheme for checking the integrity of circuitry employed in the stabilization function.

In large power generator installations, the utilization of fast responding electronic equipment for control of the generator field excitation has lead to undesired stimulation of mechanical and electrical resonances. This problem has been found to be particularly severe when multiple generators are electrically coupled together or when long transmission lines are required to distribute the generator power. The problem is generally overcome by the inclusion of a compensating control element called a power system stabilizer. A Power System Stabilizer (PSS) is an auxiliary control device used with generator excitation systems to increase the damping of the turbine generator to power system electromechanical oscillations. Operation of a PSS is well understood in the industry and the various implementation means have been well documented. One example of such a power system stabilizer is found in U.S. Pat. No. 4,788,653 "Digital Filter For Power System Stabilizer" by B. C. Henderson et al., Nov. 29, 1988, which patent is assigned to the assignee of the present invention and which patent is specifically incorporated hereinto by reference. Examples of systems employing a PSS include U.S. Pat. NO. 4,741,023 "On-Line Test and Diagnostic System for Power System Stabilizer" by R. A. Lawson, issued Apr. 26, 1988, which patent is assigned to the assignee of the present invention and U.S. Pat. No. 4,463,306 "System For Stabilizing Synchronous Machines" by F.P. de Mello et al., issued July 31, 1984, both of which are also incorporated hereinto by reference.

The field winding of the synchronous AC generator is, in the typical case, energized by an exciter which is under the control of an automatic voltage regulator. In many of these systems, the output of the PSS is fed to a summing point within the voltage regulator and serves to modulate the voltage regulator output to control generator oscillations. Some voltage regulators, however, have no such summing point or, if it exists, it may be inaccessible to outside signals. For these types of voltage regulators where the PSS signals cannot be directly applied, it is known that the appropriate signal can be injected by means of a modulator. One example of such a modulator is found in the de Mello et al. patent previously cited. This patent utilizes an autotransformer having taps that are selected by solid state switches. Because of the tap changing nature of the de Mello et al. patent, the result is a stepped change in generator excitation. A more continuous scheme for applying the modulation function may be found in U.S. Pat. No. 4,855,644 "Method and Apparatus For Damping Oscillations Of An AC Generator" by L. J. Lane (issued on Aug. 8, 1989) which is assigned to the assignee in the present invention and which patent is also specifically incorporated hereinto by reference.

The previously cited Lawson patent (4,741,023) includes a diagnostic feature which employs the application of a test signal of known frequency that will not stimulate natural frequencies of the system but will provide a means of determining the gain and phase shift characteristics of the PSS. This diagnostic scheme does not, however, test the integrity of the modulator circuit or any other factors external to the PSS. In view of the fact that this external circuitry, especially the modulator circuit, is very likely to be comprised of analog circuitry, the probability of phase shift and/or gain variations due to factors such as aging is relatively high.

Testing of such a system presents a special problem because of the low frequencies involved; i.e. the frequency shifts of the system in normal operation occur at a rate which is in the range of, approximately, 0.2 to 2.0 Hertz. As such, the proper testing of the circuitry requires considerable periods of times. It is not desirable to remove the stabilization system from the generator since instability could occur and thus an on-line testing method is desirable.

SUMMARY OF THE INVENTION

It is, therefore, an object of the present invention to provide an improved scheme for stabilizing the operation of an AC synchronous generator connected to a power distribution network.

It is a further object to provide in a power system stabilizer system, a scheme for determining the operational integrity of associated circuitry.

It is another object to provide a scheme for testing the operational integrity of circuitry for controlling the excitation of a synchronous AC generator.

It is an additional object to provide for on-line testing of the gain and phase shift of circuitry utilized in the control of the excitation of a synchronous AC generator in a power system stabilizer system.

The foregoing and other objects are achieved, in accordance with the present invention, by providing a generator stabilization system which includes a power system stabilizer for normally providing an oscillation signal having an instantaneous value proportional to generator oscillation. A modulator circuit, responsive to input signals including the oscillation signal, provides a modulated output signal for controlling the excitation of the generator. Further included is a scheme for checking the operational integrity of both the power system stabilizer and the modulator circuit which scheme includes applying a test signal of known amplitude and frequency, simulating a generator oscillation, to the power system stabilizer such that a simulated oscillation signal is propagated to the modulator circuit. A demodulation function associated with the modulator circuit develops a demodulated output signal. The demodulated output signal is then employed with a stored representation of the test signal to yield outputs representing the gain and phase shift of the combination of the power system stabilizer and modulator circuit. These outputs may be utilized in any desired manner such as display and/or for control purposes. The magnitude of the outputs may be indicative of the severity of any problems in the power system stabilizer and modulator circuit.

BRIEF DESCRIPTION OF THE DRAWINGS

While the present invention is defined in particularity in the claims annexed to and forming a part of this specification, a better understanding thereof can be had by reference to the following description taken in conjunction with the accompanying drawing in which:

DETAILED DESCRIPTION

Figure 1:
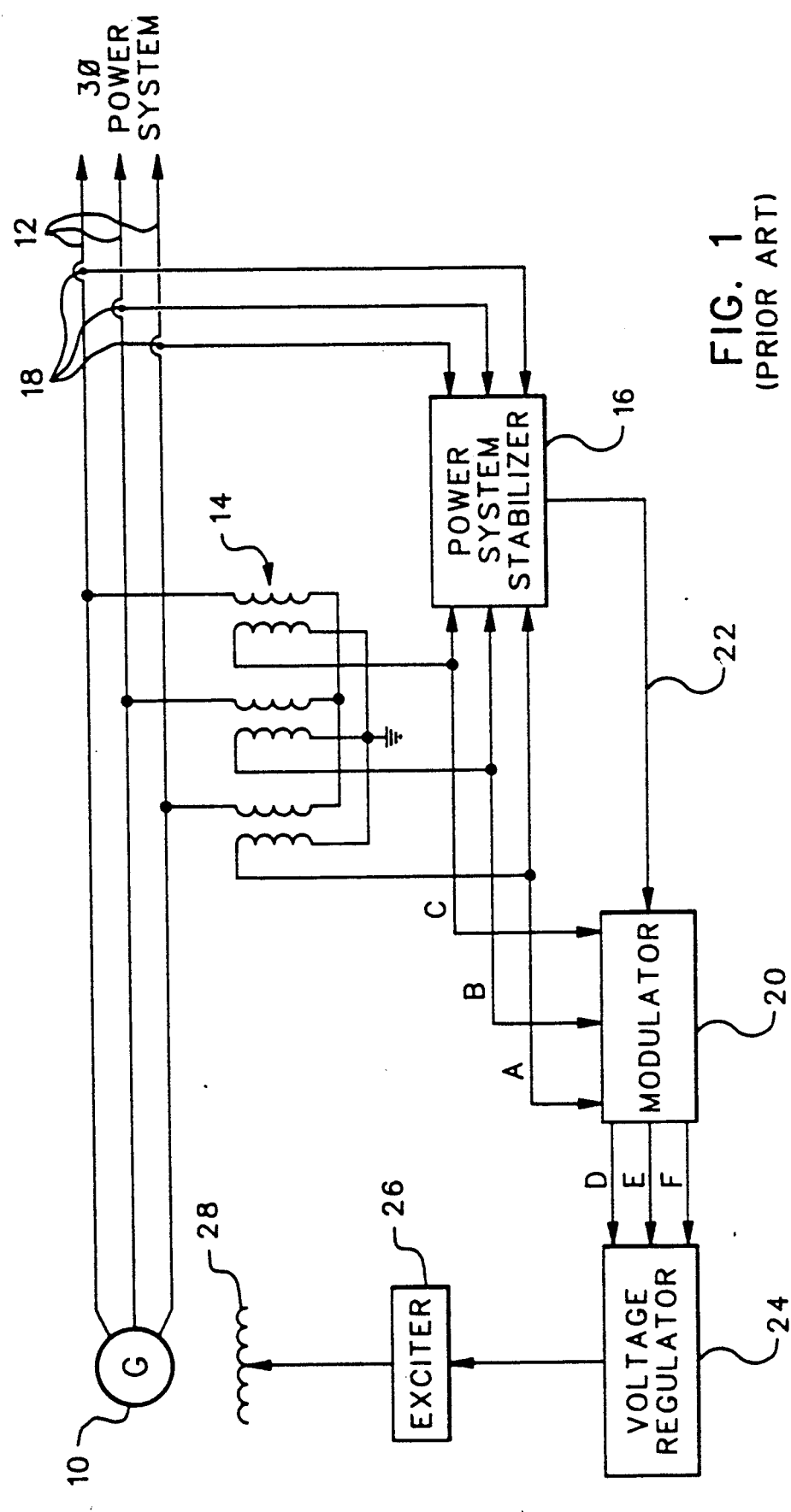
FIG. 1 is a block diagram of a three-phase power system in accordance with the prior art.

Before beginning a description of the present invention, it is believed appropriate to describe a prior art system in which the present invention is believed to have particular application. In this regard reference is first made to FIG. 1 which is a major block diagram of this environmental system. Previous reference was made to U.S. Pat. No. 4,855,644. Those familiar with that patent will recognize FIG. 1 as being taken therefrom. Specifically with reference now to FIG. 1, there is shown an AC synchronous generator 10 connected to a three-phase power system illustrated by the lines 12. A potential transformer system, illustrated as a wye connected three-phase transformer 14, provides signals proportional to the generator terminal voltage to a power system stabilizer 16, of the type known in the art, for example that described in the previously referenced U.S. Pat. No. 4,788,653. The voltage signals from the transformer 14 are also applied to a modulator 20, to which the present invention is directly applicable, by ways of lines A, B, and C. The secondary of potential transformer 14 has its common point connected to ground.

Signals proportional to the output current of the generator 10 are derived by a suitable current transformer 18. These signals are also provided to the power system stabilizer 16.

The power system stabilizer 16, in response to the input signals representing generator terminal voltage provides an output on line 22 which is an oscillation signal having an instantaneous value proportional to oscillations of the generator 10. This signal is applied to the modulator 20 such that the modulator output on lines D, E, and F (a control signal), will be the signals on the lines A, B, and C as modified by the modulator 20 in accordance with the signal on line 22. Signals from the modulator are applied to a voltage regulator 24, of customary type, the output of which is applied to an exciter 26 which, in turn, controls the excitation of the generator field winding 28.

The function of the modulator is to add to or subtract from (i.e., modulate) the generator terminal voltage signals on lines A, B, and C so that the generator excitation current becomes modified in accordance with that latter signal.

Figure 2:
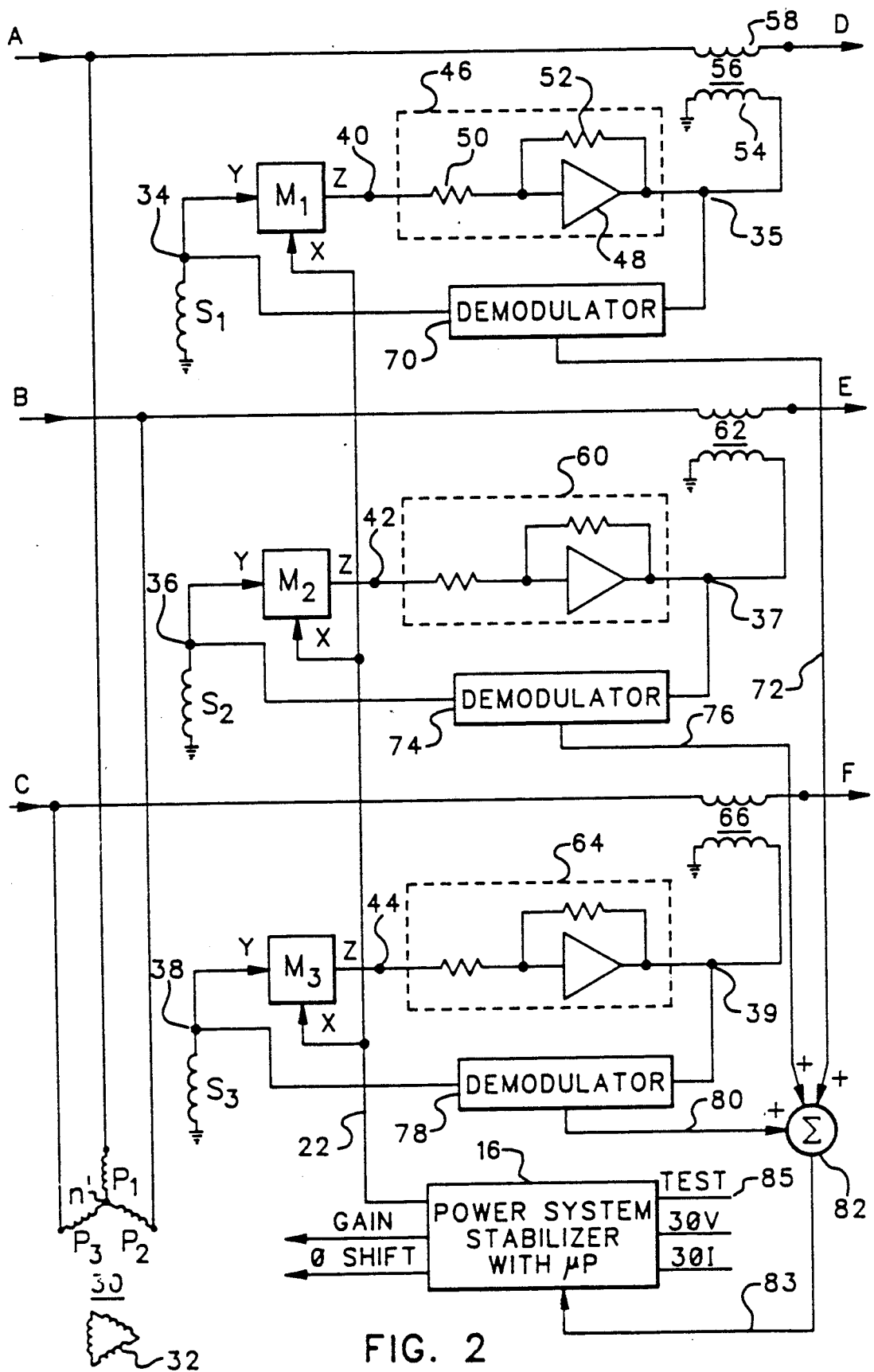
FIG. 2 is a block schematic diagram illustrating the present invention in its preferred embodiment; and, FIG. 3 is a block schematic diagram showing in greater detail a portion of the circuitry especially the modulator of FIG. 2 and further illustrating functional aspects of the invention.

Reference is now made to FIG. 2 which illustrates the present invention in its basic form. As will become apparent, the present invention includes additions to the modulator 20, as known in the prior art, in combination with certain additional changes in association with the power system stabilizer. Transformer, indicated generally at 30, includes a wye connected primary winding $P_1$, $P_2$ and $P_3$ connected to the three input lines A, B, and C. The common point (n') remains equal to the voltage at the neutral of the applied voltages. Three secondary windings $S_1$, $S_2$, and $S_3$ are connected in wye configuration with their common point being ground or neutral. A tertiary winding 32, connected in delta, is provided for the flow of third harmonic currents to help establish the neutral point.

In accordance with standard transformer theory, the voltage across the secondary windings $S_1$, $S_2$, and $S_3$, with respect to neutral or ground, as seen respectively at nodes 34, 36 and 38 will be equal to the voltages on lines A, B, and C, with respect to neutral, times the ratio of turns in the secondary to the primary windings. The three voltage signals at nodes 34, 36 and 38 are respectively applied as the "y" inputs to three multipliers $M_1$, $M_2$, and $M_3$. The second input (x) to each of the multipliers is the output of the power system stabilizer 16 on line 22. Each of the multipliers $M_1$, $M_2$, and $M_3$ is, preferably, a four quadrant multiplier which means that their respective outputs (z), as seen at the respective nodes 40, 42 and 44 are signals having magnitudes which are a product of the multiplier inputs and signs according to the relative signs of the inputs. The signal at node 40 is applied to a linear amplifier 46 which may be comprised of an operational amplifier 48 having an input resistor 50 and a feedback resistor 52 connected between its input and output. The output of linear amplifier 46 is connected to one end of a primary winding 54 of a transformer 56 the other end which is connected to ground. Transformer 56 further has a secondary winding 58 connected between the A input and the D output of the modulator 20. The voltage induced into the secondary winding 58 will be proportional to the output of the multiplier MI, as adjusted by the proportionality factor of the linear amplifier 46, and the turns ratio of the transformer. Since the secondary winding 58 is in series with the line from input A to output D, the voltage at the output D, with respect to neutral, will be equal to the algebraic sum of the voltage at A and the voltage induced into the secondary winding 58.

In a similar manner, the voltage at node 42 is applied to a linear amplifier 60 the output of which is applied to a transformer 62 in association with input B and output E. The voltage signal at node 44 is applied to a linear amplifier 64 whose output is supplied to a transformer 66 associated with input C and output F. As earlier described, with respect to FIG. 1, the signals on lines D, E, and F are applied to the voltage regulator 24 which in turn controls exciter 26 and hence, the field excitation of the generator in accordance with the teachings of the prior art.

The description thus far of FIG. 2 is the first embodiment of the modulator 20 as is shown and described in the aforementioned U.S. Pat. No. 4,855,644. The amplitude modulation scheme used with the modulator of this patent is commonly known as double sideband modulation with the modulating signal having zero dc component. This modulated signal can be demodulated by coherent or synchronous detection. In synchronous detection, a carrier wave synchronized to the transmitter carrier must be utilized. Reference is made to that patent for a more complete description of this modulation scheme.

Continuing with the description of FIG. 2, a first demodulator 70 is connected between node 34 and the output of the power amplifier 46 (node 35). The output of demodulator 70, via line 72, forms one input to a summing junction 82. In a similar manner, demodulator 74 connected between node 36 and the output of amplifier 60, node 37, provides a signal on line 76 as a second input to the summing junction 82 while a third demodulator 78 connected between node 38 and node 39 (the output of amplifier 64) provides a signal on line 80 as a third input to the summing junction of 82. The three signals on lines 72, 76 and 80 are demodulated signals. That is, for example, what may be considered a carrier signal at node 34 is modulated by the x input to the multiplier $M_1$. The modulated output signal of multiplier $M_1$ is acted upon by amplifier circuit 46. The output of demodulator 70 is a representation of the modulation signal on line 22 as seen at node 35. In similar manner, demodulators 74 and 78 provide the demodulation for the other two phases. Thus, the output of summing junction 82 will represent the signal on line 22 as seen at nodes 35, 37 and 39. This signal is applied to a microprocessor which is indicated as being within the power system stabilizer 16 although it is apparent that this capability may be elsewhere provided.

Operation of the present invention is substantially as follows. When it is desired to perform a test, the power system stabilizer remains connected to the three-phase voltage inputs from the system and a test signal, of predetermined magnitude and frequency simulating a generator oscillation is applied via line 85 to the power system stabilizer 16 from a suitable source (not specifically here shown but which source may be internal or external to the power system stabilizer). (The test signal frequency is preferably very close, to intertie oscillation frequencies, typically within the range of from 0.2 to 0.5 Hertz, which normally occur within the system. Because the intertie oscillations involve many sources in the system which oscillate as an equivalent large unit, the system is relatively insensitive to stimulation from a single source. Therefore, utilizing this frequency as a test signal results in very little system response and the response of the power system stabilizer system to the test signal is not corrupted by system responses.)

This test signal which simulates generator oscillations propagates through the power system stabilizer and the modulator which produces a signal which is then demodulated to provide the inputs to junction 82.

The signal from junction 82 is combined with a stored representation of the test signal as originally presented on line 85 to determine the amount of gain and phase shift occasioned by the power system stabilizer and the modulator circuit. Conveniently, since the power system stabilizer may include a microprocessor this combination may be there performed. In a preferred embodiment, the combination is achieved using a Discrete Fourier Transform (DFT) which results in an output representing the gain and phase shift of the test signal as acted upon by the circuitry involved. These values, that is the gain and the phase shift values, may then be displayed or compared to predetermined values to determine, for example, if the system has experienced a major failure and may also be compared to the results of previous tests to determine drift or other variances in the gain and phase shift characteristics of the circuitry.

Figure 3:
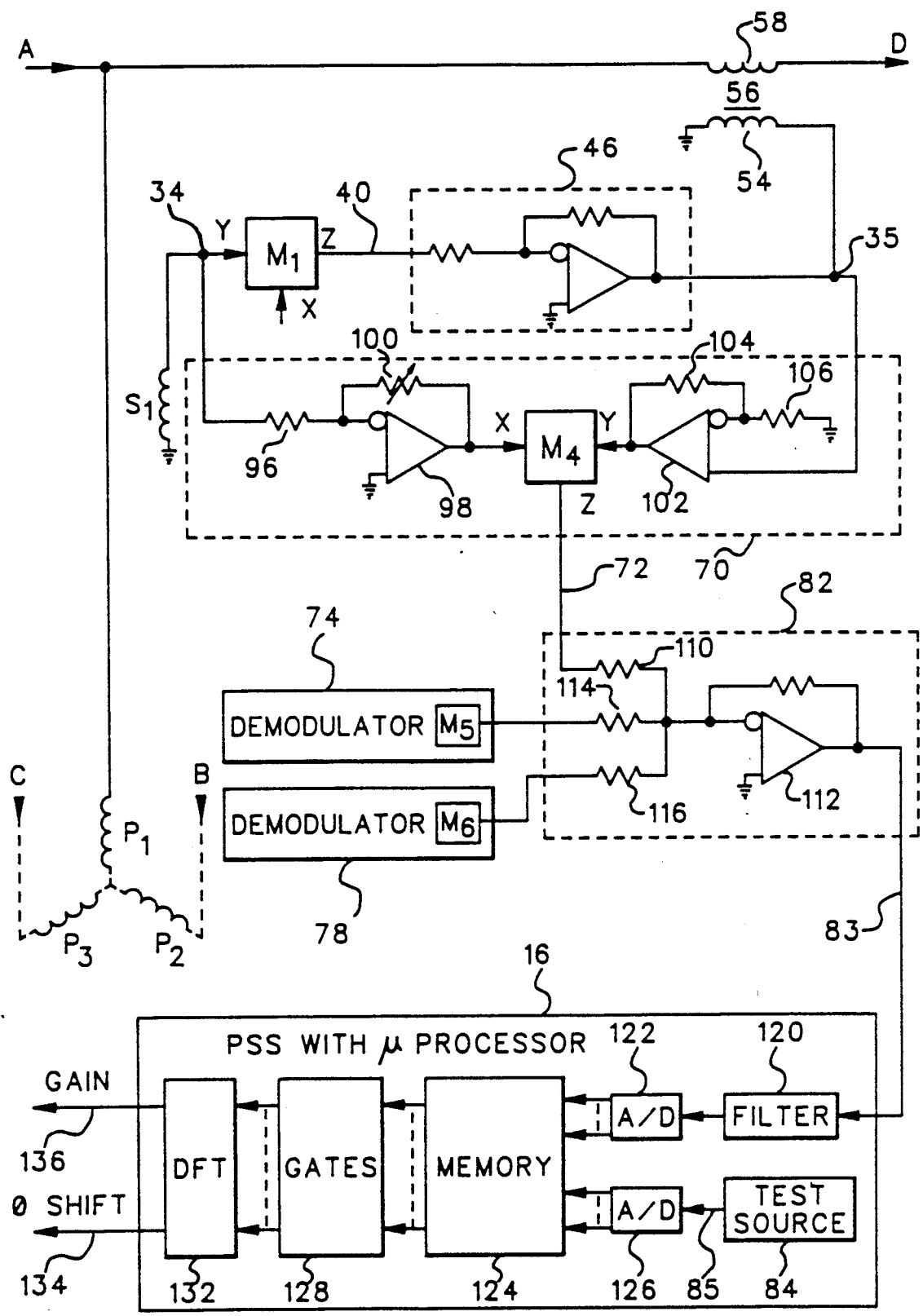

FIG. 3 shows in greater detail a preferred implementation of the present invention. As shown in FIG. 3 demodulator 70 receives the carrier signal at node 34. This signal is applied to multiplier MI and also serves, via input resistor 96, as the inverting input to an operational amplifier 98 having a variable feedback resistor 100 such that the gain of this amplifier is adjustable. The other input to amplifier 98 is connected to ground.

The output of amplifier 98 serves as the x input to a multiplier $M_4$. The y input to multiplier $M_4$ is the output of an additional operational amplifier 102 which has a feedback resistor 104 connected between its output and its inverting input which is further connected to ground via input resistor 106. The non-inverting input of amplifier 102 is connected to node 35. The output (z) of multiplier $M_4$, on line 72 is applied, via resistor 110, as one input to an amplifier 112 which has additional inputs via resistors 114 and 116 from the other demodulators 74 and 78. Amplifier 112 serves as the summing junction 82 of the FIG. 2 embodiment. Since demodulators 74 and 78 are identical in construction to that as shown in 70 a detailed showing and description is believed unnecessary.

As earlier indicated, the summing junction output on line 83 is the sum of three inputs from the demodulators and represents the demodulated value of the oscillation signal (line 22) as acted upon by the three modulation circuits and the three demodulation circuits. (The signal on line 22 will, of course, include all the effects of the power system stabilizer 16.) Mathematically the three signals from the three multipliers $M_4$, $M_5$ and $M_6$ of the three demodulators may be expressed as follows:

$$\text{Output } M_4 = \left( \frac{K_{1A} \cdot K_{2A} \cdot A_{34}^2}{100} \right) Osc_t [\cos 2\omega t + 1]^{\frac{1}{2}}$$

$$\text{Output } M_5 = \left( \frac{K_{1B} \cdot K_{2B} \cdot A_{36}^2}{100} \right) Osc_t \left[ \cos \left( 2\omega t - \frac{4\pi}{3} \right) + 1 \right]^{\frac{1}{2}}$$

$$\text{Output } M_6 = \left( \frac{K_{1C} \cdot K_{2C} \cdot A_{38}^2}{100} \right) Osc_t \left[ \cos \left( 2\omega t + \frac{4\pi}{3} \right) + 1 \right]^{\frac{1}{2}}$$

wherein:

$K_{1A}$, $K_{1B}$, $K_{1C}$ = respective gains from nodes 34, 36 and 38 to X inputs of associated multipliers $M_4$, $M_5$, and $M_6$;

$K_{2A}$, $K_{2B}$, $K_{2C}$ = respective gains from nodes 40, 42 and 44 to Y inputs of associated multipliers $M_4$, $M_5$ and $M_6$;

$A_{34}$, $A_{36}$, $A_{38}$ = amplitude of voltage signals at nodes 34, 36 and 38, respectively, during times of testing;

$\omega = 2\pi$ times the frequency of the carrier signals as seen at nodes 34, 36 and 38 during time of testing; and, $Osc_t$ = value of signal on line 22 during time of testing.

In the implementation of the demodulators the exact nature of the several amplifiers is not critical. Amplifier 98 is made adjustable and is used with amplifier 102 for scaling purposes. What is important is that the sum of the output signals from the demodulators, when combined in the summing function 82 (output on line 83) represents the test signal (and extraneous signals) as applied to the power system stabilizer and acted upon by the intermediate circuitry.

For convenience, as earlier indicated, the combining of the demodulated signal on line 83 with a stored representation of the test signal may employ existing processor capability in the power system stabilizer. As such, the signal on line 83 is applied to a filter 120, preferably a 2 pole low pass filter which acts to remove high frequencies due to system imbalances or failed phases. The output of that filter is furnished to an analog-to-digital converter 122. The digital representations of the time related values of the filtered signal are then placed into a suitable buffer or memory 124. Also stored in memory 124 is the digital value of the test signal, stored as time related values, as it was originally applied to the power system stabilizer. Since the ultimate test signal inserted was in analog form, the signal on line 85 from source 84 is first converted in analog-to-digital converter 126 to digital form for storage. (Source 84 is shown in generic form internal to the power system stabilizer but could with equal facility be external thereto.)

After the appropriate data are accumulated (e.g. a sample period of five to ten seconds) suitable gates 128 are activated to pass the data to the microprocessor to perform the Discrete Fourier Transform (DFT) as illustrated by function block 132. The outputs of this function are, as indicated on respective lines 134 and 136, signals representing phase shift and gain. These signals may be employed in any suitable manner such as display, sounding alarms, and/or modifying actions of the various operating components. A large change from a datum value, one taken when the system was known to be fully functional, may indicate a failure of the operating components. A smaller change from the datum value may indicate an abnormality such as drift.

Thus it is seen there has been shown and described a system which provides for the on-line testing of the power system stabilizer and modulator circuits in combination.

While the foregoing has described the present invention in its preferred embodiments, modifications thereto will readily occur to those skilled in the art. For example, the modulator circuit as shown in FIG. 2 is only the first embodiment described in the aforementioned U.S. Pat. No. 4,855,644, and it is apparent that the present invention will work of equal facility in all the embodiments and in fact is applicable to all similar applications. Certain elements are shown in FIG. 3 as being within the power system stabilizer. As indicated, this is an expediency taking advantage of typical capabilities of such a system. These functions could be elsewhere provided. It is not intended, therefore, that the present invention be limited to the specific embodiments shown and described and it is intended to cover in the appended claims all such modifications as fall within the true spirit and scope of the invention.

What is claimed is:

1. In a system for stabilizing the operation of an electrical generator connected to a power distribution network of the type including a power system stabilizer for providing an oscillation signal having a value which normally represents generator oscillations and a modulator circuit responsive to input signals including said oscillation signal to provide a modulated output signal for varying generator excitation, means for checking for operational integrity of said power system stabilizer and said modulator circuit comprising:
   (a) means for applying, to said power system stabilizer, a test signal of known amplitude and frequency, said test signal simulating generator oscillations and serving to produce a simulated oscillation signal for employment as said oscillation signal,
   (b) means to store representations of time related values of said test signal;
   (c) means to demodulate said modulated output signal to develop a demodulated signal;
   (d) means to store representations of time related values of said demodulated signal; and
   (e) means responsive to said representations of time related values of said demodulated signal and of said test signal to determine the gain and phase shift occasioned by said power system stabilizer and said modulator circuit with respect to said test signal.

2. The invention in accordance with claim 1 wherein said power distribution network has a range of frequencies of normal oscillation and wherein said test signal has a frequency within said range.

3. The invention in accordance with claim 1 wherein said test signal has a frequency within the approximate range of 0.2–0.5 Hertz.

4. The invention is accordance with claim 1 wherein said test signal has a frequency of approximately 0.5 Hertz.

5. The invention in accordance with claim 1 wherein said means responsive to said representations of time related values comprises means to execute a Discrete Fourier Transform.

6. The invention in accordance with claim 1 wherein said means to demodulate comprises a multiplier circuit having a first input proportional to the terminal voltage of said generator and a second input representing said modulated output signal.

7. The invention in accordance with claim 1 further including analog to digital converter means to convert said demodulated signal and said test signal to digital data for storage.

8. The invention in accordance with claim 7 further including processor means for executing a Discrete Fourier Transform with respect to the stored digital data.

9. A scheme for stabilizing the operation of a polyphase electric generator connected to a power network by controlling the excitation of said generator comprising:
   (a) a power system stabilizer normally responsive to generator terminal voltage to yield an oscillation signal representing oscillations of said generator;
   (b) a modulator circuit, including individual channels for each phase of said generator, said channels each including a multiplier responsive to said oscillation signal and to signals representing the neutral-to-line terminal voltage of said generator and a power amplifier responsive to the output of said multiplier to generate a modulated output signal for varying generator excitation;
   (c) means responsive to said modulated output signal to control the excitation of said generator; and
   (d) means for measuring the gain and phase shift of said power system stabilizer and said modulator circuit comprising:
      (i) means to apply to test signal of predetermined amplitude and frequency to said power system stabilizer to simulate generator oscillation and yield a simulated oscillation signal for employment as said oscillation signal;
      (ii) means to store representations of time related values of said test signal;
      (iii) a demodulator circuit for each channel of said modulator circuit for generating a respective demodulated signal representing the simulated oscillation signal as affected by the power system stabilizer and a respective channel of the modulator circuit;
      (iv) summing means for combining the demodulated signal from each of said channels to yield a composite demodulated signal representing said simulated oscillation signal as affected by said power system stabilizer and said channels; and (v) means responsive to said composite demodulated signal and said representations of time related values of the test signal to provide output signals representing the gain and phase shift of said power system stabilizer and said modulator circuit with respect to said test signal.

10. The invention in accordance with claim 9 wherein said power network has a range of frequencies of normal oscillation and wherein said test signal has a frequency within said range.

11. The invention in accordance with claim 9 wherein said test signal has a frequency within the approximate range of 0.2–0.5 Hertz.

12. The invention in accordance with claim 9 wherein said test signal has a frequency of approximately 0.5 Hertz.

13. The invention in accordance with claim 9 wherein said means responsive to the composite demodulated signal includes means to execute a Discrete Fourier Transform.

14. The invention in accordance with claim 9 wherein said demodulator circuit includes a multiplier circuit having a first input proportional to the terminal voltage of said generator and a second input representing the modulated output signal.

15. The invention in accordance with claim 9 further including means to store representations of said composite demodulated signal and wherein said means responsive to said composite demodulated signal acts upon the stored representations of said composite demodulated signal and the stored representations of time related values of the test signal.

16. The invention in accordance with claim 15 further including analog-to-digital converter means to convert said composite demodulated signal and said test signal to digital data for storage.

17. The invention in accordance with claim 16 further including processor means for executing a Discrete Fourier Transform with respect to the stored digital data.

* * * * *